United States Patent
Englsberger et al.

(10) Patent No.: US 12,280,505 B2
(45) Date of Patent: Apr. 22, 2025

(54) METHOD AND COMPUTER PROGRAM PRODUCT FOR CONTROLLING A ROBOT

(71) Applicant: DEUTSCHES ZENTRUM FÜR LUFT-UND RAUMFAHRT E.V., Bonn (DE)

(72) Inventors: Johannes Englsberger, Wessling (DE); Gianluca Garofalo, Wessling (DE); George Adrian Mesesan, Wessling (DE)

(73) Assignee: DEUTSCHES ZENTRUM FÜR LUFT- UND RAUMFAHRT E.V., Bonn (DE)

( * ) Notice: Subject to any disclaimer, the term of this patent is extended or adjusted under 35 U.S.C. 154(b) by 0 days.

(21) Appl. No.: 18/008,760

(22) PCT Filed: Jun. 10, 2021

(86) PCT No.: PCT/EP2021/065699
§ 371 (c)(1),
(2) Date: Dec. 7, 2022

(87) PCT Pub. No.: WO2021/250201
PCT Pub. Date: Dec. 16, 2021

(65) Prior Publication Data
US 2024/0261964 A1    Aug. 8, 2024

(30) Foreign Application Priority Data
Jun. 10, 2020    (DE) .................... 10 2020 115 517.4

(51) Int. Cl.
B25J 9/16    (2006.01)
(52) U.S. Cl.
CPC ........... *B25J 9/1643* (2013.01); *B25J 9/1607* (2013.01)

(58) Field of Classification Search
CPC ............................. B25J 9/1643; B25J 9/1607
See application file for complete search history.

(56) References Cited

U.S. PATENT DOCUMENTS 4,999,553 A    3/1991 Seraji
2010/0280661 A1    11/2010 Abdallah et al.
(Continued)

FOREIGN PATENT DOCUMENTS

CN    101947787 A    1/2011
CN    103648733 A    3/2014
(Continued)

OTHER PUBLICATIONS

Y. Nakamura, H. Hanafusa, and T. Yoshi Kawa. Taskpriority based redundancy control of robot manipulators. The International Journal of Robotics Research, 6(2): 3-15, 1987. doi: 10.1177/027836498700600201.
(Continued)

*Primary Examiner* — Adam R Mott
*Assistant Examiner* — Alyzia N Dilworth
(74) *Attorney, Agent, or Firm* — Davidson Kappel LLC (57) ABSTRACT

A method for controlling a kinematically redundant robot (100) in order to fulfill multiple tasks. At least one passivity-based first controller module (102) is used, at least one task target description and at least one associated task mapping are computed for the at least one first controller module (102), at least one weighting is computed for the tasks, and the at least one first controller module (102) is integrated into an overall controller (104), using the at least one weighting. Moreover, the invention relates to a computer program product that includes commands which, when the program is executed with the aid of at least one processor, prompt the processor to carry out such a method.

18 Claims, 5 Drawing Sheets

(56) References Cited

U.S. PATENT DOCUMENTS

| | | | |
|---|---|---|---|
| 2011/0160906 A1 | 6/2011 | Orita et al. | |
| 2013/0013112 A1* | 1/2013 | Darish | B62D 57/032 700/262 |
| 2013/0268256 A1 | 10/2013 | Dariush | |
| 2014/0229006 A1 | 8/2014 | Ruempling et al. | |
| 2014/0379126 A1 | 12/2014 | Ueberle | |
| 2015/0343633 A1 | 12/2015 | Gouaillier et al. | |
| 2018/0081340 A1 | 3/2018 | Haddadin et al. | |
| 2020/0276704 A1 | 9/2020 | Sindhwani et al. | |
| 2023/0028405 A1* | 1/2023 | Malzahn | B25J 9/1617 |

FOREIGN PATENT DOCUMENTS

| | | | |
|---|---|---|---|
| CN | 104227715 A | 12/2014 | |
| CN | 104380306 A | 2/2015 | |
| CN | 109079780 A | 12/2018 | |
| CN | 110799308 A | 2/2020 | |
| DE | 102010064267 B4 | 6/2015 | |
| DE | 102015106227 B3 | 5/2016 | |
| EP | 2740012 B1 | 11/2017 | |
| EP | 1972416 B1 | 4/2018 | |
| FR | 3054048 B1 | 8/2018 | |
| WO | WO2021123057 A1 | 6/2021 | |

OTHER PUBLICATIONS

Antonelli. Stability Analysis for Prioritized closedloop inverse kinematic algorithms for redundant robotic systems. IEEE Transactions on Robotics, 25(5):985-994, 2009.
F. Kanehiro, H. Hirukawa, and S. Kajita. Openhrp: Open Architecture Humanoid Robotics Platform. The International Journal of Robotics Research, 23(2): 155-165, 2004. doi: 10.1177/0278364904041324.
L. Sentis, J. Park, and O. Khatib. Compliant Control of multicontact and center-of-mass behaviors in humanoid robots. IEEE Transactions on Robotics, 26(3):483-501, 2010.
J. Peters, M. Mistry, F. Udwadia, J. Nakanishi, and S. Schaal. A unifying framework for robot control with redundant dofs. Autonomous Robots, 24:1-12, 2008. doi: 10.1007/s10514-007-9051-x.
Adrien Escande, Nicolas Mansard, and Pierre-Brice Wieber. Hierarchical quadratic programming: fast online humanoid-robot motion generation. The International Journal of Robotics Research, 33(7):1006-1028, 2014. doi: 10.1177/0278364914521306.
K. Bouyarmane and A. Kheddar. On Weight-Prioritized multitask control of humanoid robots. IEEE Transactions on Automatic Control, 63(6):1632-1647, Jun. 2018. ISSN 2334-3303. doi: 10.1109/TAC.2017.2752085.
M. A. Hopkins, D. W. Hong, and A. Leonessa. Compliant locomotion using whole-body control and divergent component of motion tracking. In IEEE Int. Conf. on Robotics and Automation (ICRA), pp. 5726-5733, May 2015. doi: 10.1109/ICRA.2015.7140001.
J. Englsberger, G. Mesesan, A. Werner, and C. Ott. Torque-Based Dynamic Walking—a long way from simulation to experiment. In IEEE Int. Conf. on Robotics and Automation (ICRA), pp. 440-447, 2018.
B. Paden and B. Riedle. A Positive-Real Modification of a class of nonlinear controllers for robot manipulators. In 1988 American Control Conference, pp. 1782-1785, Jun. 1988. doi: 10.23919/ACC.1988.4790015.
B. Henze, M. A. Roa, and Ch. Ott. Passivity-based whole-body balancing for torque-controlled humanoid robots in multi-contact scenarios. The International Journal of Robotics Research, 35(12):1522-1543, 2016. doi: 10.1177/0278364916653815.
G. Mesesan, J. Englsberger, G. Garofalo, C. Ott, and15:47 Oct. 6, 2020 A. Albu-Schäffer. Dynamic walking on compliant and uneven terrain using dem and passivity-based wholebody control. In IEEE-RAS 19th Int. Conf. on Humanoid Robots (Humanoids), pp. 25-32, 2019.
A. Dietrich and C. Ott. Hierarchical Impedance-Based tracking control of kinematically redundant robots. IEEE Transactions on Robotics, 36(1):204-221, 2020. ISSN 1941-0468. doi: 10.1109/TRO.2019.2945876.
J. Ackermann. Parameter space design of robust control systems. IEEE Transactions on Automatic Control, 25 (6): 1058-1072, Dec. 1980. ISSN 2334-3303. doi:10.1109/TAC.1980.1102505.
S. Chiaverini. Singularity-robust task-priority redundancy resolution for real-time kinematic control of robot manipulators. *IEEE Transactions on Robotics and Automation*, 13(3):398-410, Jun. 1997. ISSN 2374-958X. doi: 10.1109/70.585902.
A. Dietrich, C. Ott, and A. Albu-Schaffer. Multiobjective compliance control of redundant manipulators:hierarchy, control, and stability. In IEEE/RSJ Int. Conf. on Intelligent Robots and Systems, pp. 3043-3050, Nov. 2013. doi: 10.1109/IROS.2013.6696787.
J. Englsberger, A. Werner, C. Ott, B. Henze, M. A. Roa, G. Garofalo, R. Burger, A. Beyer, O. Eiberger, K. Schmid, and A. Albu-Schaffer. Overview of the torque-controlled humanoid robot TORO. In IEEERAS Int. Conf. on Humanoid Robots, pp. 916-923, Nov. 2014. doi: 10.1109/HUMANOIDS.2014.7041473.
J. Englsberger, C. Ott, and A. Albu-Schaffer. Three-Dimensional Bipedal Walking Control Based on divergent component of motion. *IEEE Transactions on Robotics*, 31(2):355-368, Apr. 2015. ISSN 1941-0468. doi: 10.1109/TRO.2015.2405592.
L. Righetti, J. Buchli, M. Mistry, and S. Schaal. Inverse dynamics control of floating-base robots with external constraints: A unified view. In IEEE Int. Conf. on Robotics and Automation, pp. 1085-1090, May 2011. doi: 10.1109/ICRA.2011.5980156.
Cisneros Rafael et al, "QP-based task-space hybrid / parallel control for multi-contact motion in a torque-controlled humanoid robot", 2019 IEEE-RAS 19th International Conference on Humanoid Robots (Humanoids), IEEE, Oct. 15, 2019 (Oct. 15, 2019), Seite 663-670, XP033740754.
Cisneros Rafael et al., "Robust Humanoid Control Using a QP Solver with Integral Gains", 2018 IEEE/RSJ International Conference on Intelligent Robots and Systems (IROS), IEEE,Oct. 1, 2018 (Oct. 1, 2018), Seite 7472-7479, XP033490715 Doi: 10.1109/IROS.2018.8593417.
IPRP for PCT/EP2021/065699, dated Jun. 10, 2021.

* cited by examiner

METHOD AND COMPUTER PROGRAM PRODUCT FOR CONTROLLING A ROBOT

The present invention relates to a method for controlling a kinematically redundant robot in order to fulfill multiple tasks. Moreover, the present invention relates to a computer program product for carrying out such a method.

The simultaneous control of multiple tasks represents an important research topic in the field of robotic control. While earlier studies considered the simpler case of controlling a single task and the corresponding nullspace, i.e., the remaining degrees of freedom of the robot, for kinematically redundant robots, several established methods presently exist that allow handling of multiple tasks with and without priorities. The literature makes a distinction between studies that solve the task coordination problem initially on a kinematic level, and studies that handle the control problem directly on the dynamic level. A further important classification option is the division into methods that require strict task priorities via hierarchical controllers, and other methods that apply a soft prioritization via task weighting.

At the kinematic level, hierarchical controllers that are based on nullspace projections and that guarantee a strict task hierarchy have been proposed in the publications by Y. Nakamura, H. Hanafusa, and T. Yoshi Kawa, Task-priority based redundancy control of robot manipulators, The International Journal of Robotics Research, 6(2): 3-15, 1987, doi: 10.1177/027836498700600201; and G. Antonelli, Stability analysis for prioritized closed-loop inverse kinematic algorithms for redundant robotic systems, IEEE Transactions on Robotics, 25(5):985-994, 2009. To address the problem of possible task singularities, a singularity-robust inverse kinematics method has been proposed in the publication by F. Kanehiro, H. Hirukawa, and S. Kajita, Openhrp: Open architecture humanoid robotics platform, The International Journal of Robotics Research, 23(2):155-165, 2004, doi: 10.1177/0278364904041324. However, due to these singularity-robust inverse kinematics, the strict task hierarchy is lost, since ultimately a weighting is thus generated between the individual tasks.

Other methods handle multiple tasks simultaneously on the dynamic level. The "operational space" method has been further developed to enable the control of humanoid robots. In this regard, reference is made to the publications by L. Sentis and O. Khatib, Synthesis of whole-body behaviors through hierarchical control of behavioral primitives, International Journal of Humanoid Robotics, 2(4): 505-518, 2005; and L. Sentis, J. Park, and O. Khatib, Compliant control of multicontact and center-of-mass behaviors in humanoid robots, IEEE Transactions on Robotics, 26(3): 483-501, 2010. Other methods based on "inverse dynamics" (ID) use hierarchical quadratic programs (QPs). In this regard, reference is made to the publications by J. Peters, M. Mistry, F. Udwadia, J. Nakanishi, and S. Schaal, A unifying framework for robot control with redundant DOFs, Autonomous Robots, 24:1-12, 2008, doi: 10.1007/s10514-007-9051-x; Adrien Escande, Nicolas Mansard, and Pierre-Brice Wieber, Hierarchical quadratic programming: Fast online humanoid-robot motion generation, The International Journal of Robotics Research, 33(7):1006-1028, 2014, doi: 10.1177/0278364914521306; and K. Bouyarmane and A. Kheddar, On weight-prioritized multitask control of humanoid robots, IEEE Transactions on Automatic Control, 63(6): 1632-1647, June 2018, ISSN 2334-3303, doi: 10.1109/TAC.2017.2752085. Most of the stated methods are aimed at a strict task decoupling. For example, this ensures, at least in theory, that different tasks do not mutually influence one another, and likewise that the particular transient response of individual tasks after disturbances is completely independent of other task coordinates.

The method provided here is inspired by the family of inverse dynamics-based tracking controllers, which seek a soft compromise between a series of tasks by using a single weighted quadratic program (QP). In this regard, reference is made to the publications by M. A. Hopkins, D. W. Hong, and A. Leonessa, Compliant locomotion using whole-body control and divergent component of motion tracking, IEEE Int. Conf. on Robotics and Automation (ICRA), pages 5726-5733, May 2015, doi: 10.1109/ICRA.2015.7140001; T. Koolen, S. Bertrand, G. Thomas, T. de Boer, T. Wu, J. Smith, J. Englsberger, and J. Pratt, Design of a momentum-based control framework and application to the humanoid robot atlas, International Journal of Humanoid Robotics, 13(01):1650007, 2016, doi: 10.1142/S0219843616500079; and J. Englsberger, G. Mesesan, A. Werner, and C. Ott, Torque-based dynamic walking—a long way from simulation to experiment, IEEE Int. Conf. on Robotics and Automation (ICRA), pages 440-447, 2018. Such controllers are very easy to implement, and are characterized by their high level of flexibility. However, in comparison to passivity-based methods according to the publications by B. Paden and B. Riedle, A positive-real modification of a class of nonlinear controllers for robot manipulators, 1988 American Control Conference, pages 1782-1785, June 1988, doi: 10.23919/ACC.1988.4790015; A. Dietrich, Whole-body Impedance Control of Wheeled Humanoid Robots, Volume 116, Springer International Publishing, 2016, ISBN 978-3-319-40557-5; B. Henze, M. A. Roa, and Ch. Ott, Passivity-based whole-body balancing for torque-controlled humanoid robots in multi-contact scenarios, The International Journal of Robotics Research, 35(12):1522-1543, 2016, doi: 10.1177/0278364916653815; G. Mesesan, J. Englsberger, G. Garofalo, C. Ott, and A. Albu-Schäffer, 15:47 6/10/2020 [sic], Dynamic walking on compliant and uneven terrain using DCM and passivity-based whole-body control, IEEE-RAS 19th Int. Conf. on Humanoid Robots (Humanoids), pages 25-32, 2019; and A. Dietrich and C. Ott, Hierarchical impedance-based tracking control of kinematically redundant robots, IEEE Transactions on Robotics, 36(1):204-221, 2020, ISSN 1941-0468, doi: 10.1109/TRO.2019.2945876, inverse dynamics-based controllers are less robust with regard to model errors and contact uncertainties, so that in actual use, problems such as vibrations, for example, occur, which must then in turn be handled with the aid of heuristic methods.

Furthermore, the provided method is inspired by the weighting-based multitasking controller from the publication by K. Bouyarmane and A. Kheddar, On weight-prioritized multitask control of humanoid robots, IEEE Transactions on Automatic Control, 63(6):1632-1647, June 2018, ISSN 2334-3303, doi: 10.1109/TAC.2017.2752085, and also by the strictly hierarchical passivity-based controller from the publication by A. Dietrich and C. Ott, Hierarchical impedance-based tracking control of kinematically redundant robots, IEEE Transactions on Robotics, 36(1):204-221, 2020, ISSN 1941-0468, doi: 10.1109/TRO.2019.2945876. Similarly as in the publication by K. Bouyarmane and A. Kheddar, On weight-prioritized multitask control of humanoid robots, IEEE Transactions on Automatic Control, 63(6): 1632-1647, June 2018, ISSN 2334-3303, doi: 10.1109/TAC.2017.2752085, the provided method uses a quadratic program (QP) to combine the control objectives of the individual tasks or to weight them against one another. However, in the publication by K. Bouyarmane and A.

Kheddar, On weight-prioritized multitask control of humanoid robots, IEEE Transactions on Automatic Control, 63(6): 1632-1647, June 2018, ISSN 2334-3303, doi: 10.1109/TAC.2017.2752085, each of the controllers associated with the individual tasks is computed based on inverse dynamics, a unit matrix being used as desired inertia, which corresponds to feedback linearization. In contrast, the provided method computes the controllers associated with the individual tasks, based on the concept of passivity, and uses the natural inertia of the robot, so that a behavior similar to that of a PD+ controller is achieved. In contrast to the method known from the publication by A. Dietrich and C. Ott, Hierarchical impedance-based tracking control of kinematically redundant robots, IEEE Transactions on Robotics, 36(1):204-221, 2020, ISSN 1941-0468, doi: 10.1109/TRO.2019.2945876, which is likewise based on the use of the natural inertia for the control approach, the provided method uses a weighted QP formulation, i.e., a soft prioritization, thus allowing combination of an arbitrary number of various tasks, the method also resulting in less aggressive behavior in certain situations, for example when a task singularity occurs.

The object underlying the present invention is to improve a method mentioned at the outset. Moreover, the object underlying the present invention is to provide a computer program product mentioned at the outset.

The object is achieved using a method having the features of claim 1. Moreover, the object is achieved using a computer program product having the features of claim 15. Advantageous embodiments and/or refinements are the subject matter of the subclaims.

The method may be used for closed-loop control of the robot. The method may be used, for example, in service robotics, in medical robotics, in Industry 4.0, and in the area of robotic assistance for astronauts. In principle, the method may be used anywhere that force/torque-controlled robots with kinematic redundancy may be employed, and thus where high precision as well as a flexible human-robot interaction or surroundings-robot-interaction are desired.

A kinematically redundant robot may have multiple degrees of freedom, in such a way that multiple tasks may be implemented at the same time. The tasks may be independent of one another. The tasks may be implementable, at least in part, at the same time. The robot may be force-controlled and/or torque-controlled. The passivity-based controller module may be an impedance-based controller module. In the present context, the term "passivity" is used in particular for delimiting an "activity" in which an undesirable energy increase occurs in the system.

In the present context, the phrase "task target description" describes in particular a variable that results from a combination of terms, corresponding to the actual objective of the particular task, with appropriate pilot control or compensation terms. The corresponding objective of the task may be made up, for example, of a nominal tracking of a reference trajectory and/or also made up, advantageously at the same time, of the flexible impedance behavior, for example in the case of an interaction with the surroundings, an object, or a human.

The pilot control and/or compensation terms may completely or partially compensate for gravitation effects as well as Coriolis and/or centrifugal effects, for example, in order to generate the actual desired behavior and/or the actual desired dynamics.

In the present context, the phrase "task mapping" describes in particular a variable that establishes the relationship between the given manipulated variables and/or control inputs and the particular above-mentioned task target description. The manipulated variables and/or control inputs may be made up, for example, of settable torques in the robot joints, and in the case of free-floating robots such as humanoid robots, for example, also of contact forces which under certain conditions result from the constraints between the joint torques and given end effector accelerations, for example robot foot accelerations.

The at least one task target description and the at least one associated task mapping may be computed in such a way that a nominal behavior of the at least one first controller module corresponds to the behavior of a mass-spring-damper system.

The at least one task target description and the at least one associated task may be computed based on a natural robot inertia.

The at least one task target description and the at least one associated task mapping may be computed in such a way that task-specific Coriolis and centrifugal effects remain unchanged, while all other Coriolis and centrifugal effects are compensated for.

The at least one task target description may be computed as a task vector. The task vector may indicate a force, a force direction, a torque, and/or a torque direction. Desired task force $f_{k,des}$ in equation (17) represents such a task vector. In addition, the individual task vectors may advantageously be combined to form a combined task vector. "Combination of all desired task forces" $f_{des}$ described in equation (21) represents an example of such a combined task vector.

The at least one associated task mapping may be computed as a task mapping matrix. The task mapping matrix may also be referred to as a mapping matrix T or a mapping matrix U. Matrix $T_k$ described in equation (12), which may be referred to as a "dynamically consistent pseudoinverse" of the transposition of task Jacobian matrix $J_k$, represents an example of such a task mapping matrix. The individual task mapping matrices may also advantageously be combined into a unified task mapping matrix T, as described in equation (22).

At least one further controller module may be integrated into the overall controller. At least one further controller module formulated as a constraint may be integrated into the overall controller.

The at least one first controller module and/or the at least one further controller module may be weighted. A weighting matrix may be used for the weighting. The weighting matrix may also be referred to as a weighting matrix W.

The at least one first controller module and/or the at least one further controller module may be weighted in such a way that the overall controller has an at least approximately passive behavior, even for an overdetermined control problem.

The at least one first controller module and/or the at least one further controller module may be optimized with the aid of at least one pseudoinverse and/or at least one inverse.

The at least one first controller module and/or the at least one further controller module may be optimized with the aid of at least one optimization variable. The at least one first controller module and/or the at least one further controller module may be quadratically optimized. The quadratic optimization may be implemented by a single instance or by multiple instances.

At least one of the controller modules may be designed as a tracking controller. At least one of the controller modules may be designed as a regulation controller. A separate controller module may be assigned to each controllable degree of freedom.

The computer program product may be present on a computer-readable memory medium, on a computer-readable data medium, or as a data medium signal.

The method may include the following steps: a) computing the desired task forces and the associated task mapping matrices for all passive tracking controller modules, the nominal behavior of the passive tracking controller modules corresponding to that of mass-spring-damper systems, in addition the natural inertia of the robot being maintained, and furthermore the task-specific Coriolis and centrifugal effects remaining unchanged, while all other Coriolis and centrifugal effects are compensated for; b) computing the particular passivity-guaranteeing or passivity-facilitating weighting matrices for all tasks, c) integrating and combining the individual passive tracking controller modules by optimization to form an overall controller, using the particular passivity-guaranteeing or passivity-facilitating weighting matrices.

In addition to the passive tracking controller modules, other controllers or controller modules may be integrated in method step c). In method step c), in addition to the weighted tasks, one or multiple tasks may also be formulated as a constraint and correspondingly integrated into the overall controller via the optimization. A pseudoinverse may be used in method step c) for the optimization. In method step c), the optimization may be based on the concept of quadratic optimization or quadratic programming (QP).

The present invention may relate to a controller module for controlling torque-based robots. The controller module may include a task mapping matrix and a desired task vector, it being possible for a nominal behavior of the controller module to correspond to a mass-spring-damper system.

The corresponding mass or inertia of the natural mass or inertia of the robot, optionally projected into the corresponding task space, may thus correspond to an impedance behavior, referred to as compliance behavior, which is based on the natural robot mass or the natural robot inertia, and which thus dispenses with the so-called inertia shaping.

The task-specific Coriolis and centrifugal effects may remain unchanged, while all other Coriolis and centrifugal effects are compensated for, as the result of which the passivity of the controller module may be achieved.

The controller module may be designed as a tracking controller. The controller module may be designed as a regulation controller, and a pilot control may thus be dispensed with.

An arbitrary number of such controller modules may be combined to form an overall controller. An arbitrary number of such controller modules and an arbitrary number of other controllers or controller modules may be combined to form an overall controller.

The present invention may relate to such an overall controller, it being possible for a soft prioritization to take place with the aid of weighting of the tasks, corresponding to the controller modules.

The weighting of the tasks corresponding to the controller modules may be designed in such a way that the passivity of the overall controller is guaranteed, or a behavior of the overall controller is generated which best approaches a passive behavior, even if the objectives of the individual tasks conflict and an overdetermined control problem is thus present.

In addition, a task or multiple tasks may be formulated as a hard constraint, while all other tasks are based on such controller modules and are taken into account by a soft weighting or are integrated into the overall controller.

For solving the control problem, a quadratic optimization may be used, which may be implemented by a single instance for the quadratic optimization, or also by multiple instances for the quadratic optimization.

One or multiple pseudoinverses or inverses may be used to solve the control problem.

A dedicated controller module may be assigned to each controllable degree of freedom, as the result of which a maximum granularity or the maximum possible decoupling of the individual task controllers is achieved.

In summary and stated in other words, the present invention thus results, among other things, in a modular passive tracking controller for force-/torque-controlled robots.

The controller according to the present invention allows a robust control of redundant robotic systems which is precise and at the same time flexible. This is achieved by using passivity-based controller modules, which may be combined to form an overall controller with the aid of various optimization methods (depending on the problem in question). By use of a particular weighting of the various tasks, the passivity of the overall controller, once again depending on the problem in question, is either guaranteed or at least facilitated. This particular weighting is based on using the particular inverted task inertia matrix, multiplied by a scalar task weighting number, as a weight for the individual tasks. Controller design and analysis are based on the concept of passivity or on Lyapunov theory, thus achieving the high level of robustness of the control.

The present method has proven to be very flexibly usable, with robustness against singularities and robustness with regard to modeling errors and measuring noise (changing the controller structure online is easily possible, as well as combination with other controller methods), and also very robust upon contact with the surroundings. The tuning effort during actual experiments or for actual applications is very low. An arbitrary number of tasks may be combined with one another; each task contributes to the overall result, corresponding to its weighting.

The present method thus combines the most important advantages of all methods described in the related art for the control of redundant, torque-controlled robotic systems, while avoiding all disadvantages.

The present method covers virtually the entire spectrum between inverse dynamics-based controllers and the very robust so-called PD+-based controllers. The granularity of the desired decoupling or the modularity of the individual subcontrollers is freely selectable.

The technical field addressed in particular by the present invention is the control of redundant, torque-controlled robotic systems. Solving multitasking tasks represents a difficult problem, in particular with regard to stability and passivity of the overall controller, precise tracking of desired reference trajectories, robustness with regard to modeling accuracy and sensor noise, robustness against singularities, flexibility in implementation and combinability of different subcontrollers, and contact stability.

The related art encompasses essentially two different methods which partially solve this problem: inverse dynamics-based methods on the one hand, and passivity- or impedance-based methods on the other hand. Both solution approaches contained in the related art have certain disadvantages which thus far have not been overcome:

Inverse dynamics are not passive, so that serious stability problems may occur in actual application scenarios. In addition, inverse dynamics are not robust with regard to modeling accuracy and sensor noise, and are also susceptible to singularities. Furthermore, the contact stability cannot always be ensured using inverse dynamics-based control methods.

The passivity- or impedance-based methods known from the related art generally have either poor tracking of the desired reference trajectories or a susceptibility to singularities. In addition, the corresponding controller implementation is generally inflexible, and a combination of different subcontrollers or controller types is not provided.

The present invention is based on a method for controlling redundant, torque-controlled robotic systems in which passive or impedance-based tracking controller modules are combined with one another via optimization. By use of a particular type of weighting, it is ensured that due to the combination/synthesis of the individual controller modules, the passivity of the overall system is not lost, or that the corresponding combination/synthesis does not result in an activity, i.e., a corresponding undesirable increase in the energy in the system. In this way, all above-mentioned advantages are achieved and the corresponding disadvantages are avoided. In particular, the method underlying the present invention ensures the stability and passivity of the overall system, or facilitates the latter in the case that stabilization or passivation of the overall system is technically impossible, achieves precise tracking of the desired reference trajectories, provided that they are not inconsistent and are thus technically achievable, is robust with respect to singularities, modeling accuracy, and sensor noise, is characterized by good contact stability, and allows a flexible implementation in which, among other things, different types of controllers may be combined with one another. The method underlying the present invention thus completely solves all problems addressed here.

Exemplary embodiments of the present invention are described in greater detail below with reference to figures, which schematically show the following by way of example.

One embodiment of a modular passive tracking controller (MPTC) for "stack of tasks"-based controller-frameworks is described.

Abstract—This work introduces the so-called Modular Passive Tracking Controller (MPTC), a generic passivity-based controller, which aims at independently fulfilling several subtask objectives. These are combined in a stack of tasks (SoT) that serves as a basis for the synthesis of an overall system controller. The corresponding analysis and controller design are based on Lyapunov theory. An important contribution of this work is the design of a specific optimization weighting matrix that ensures passivity of an overdetermined and thus conflicting task setup. The proposed framework is validated through simulations and experiments for both fixed-base and free-floating robots.

I. Introduction

Simultaneous control of multiple tasks has emerged as a major research topic in robotic control. While initial works considered the simpler case of a single task and its nullspace for a kinematically redundant robot, nowadays there exist several well established frameworks for handling multiple tasks with and without priorities. In the literature one may distinguish between works that solve the task coordination problem first on a kinematic level, and works that formulate the control directly for the dynamics. Another important classification can be done based on the use of strict task priorities via hierarchic controllers as compared to controllers which apply a soft prioritization via task weighting.

At the kinematics level, hierarchical controllers based on either successive or augmented nullspace projections have been proposed in order to ensure a strict task hierarchy (Y. Nakamura, H. Hanafusa, and T. Yoshikawa. Task-priority based redundancy control of robot manipulators. The International Journal of Robotics Research, 6(2): 3-15, 1987. doi: 10.1177/027836498700600201, G. Antonelli. Stability Analysis for Prioritized closed-loop inverse kinematic algorithms for redundant robotic systems. IEEE Transactions on Robotics, 25(5):985-994, 2009). For the handling of task singularities, a singularity robust inverse kinematics has been proposed (S. Chiaverini. Singularity-robust task-priority redundancy resolution for real-time kinematic control of robot manipulators. *IEEE Transactions on Robotics and Automation*, 13(3):398-410, June 1997. ISSN 2374-958X. doi: 10.1109/70.585902). However, this singularity robust inverse destroys the strict task hierarchy and effectively generates a weighting among different tasks.

Other frameworks handle multiple tasks at the dynamics level. The operational space approach has been extended in this direction with applications in humanoid robotics (L. Sentis and O. Khatib. Synthesis of Whole-Body behaviors through hierarchical control of behavioral primitives. *International Journal of Humanoid Robotics*, 2(4): 505-518, 2005, L. Sentis, J. Park, and O. Khatib. Compliant Control of multicontact and center-of-mass behaviors in humanoid robots. *IEEE Transactions on Robotics*, 26(3):483-501, 2010). Other Inverse Dynamics (ID) based controllers use hierarchic quadratic programs (QP) (J. Peters, M. Mistry, F. Udwadia, J. Nakanishi, and S. Schaal. A unifying framework for robot control with redundant dofs. *Autonomous Robots*, 24: 1-12, 2008. doi: 10.1007/s10514-007-9051-x, Adrien Escande, Nicolas Mansard, and Pierre-Brice Wieber. Hierarchical quadratic programming: fast online humanoid-robot motion generation. *The International Journal of Robotics Research*, 33(7):1006-1028, 2014. doi: 10.1177/0278364914521306, K. Bouyarmane and A. Kheddar. On Weight-Prioritized multitask control of humanoid robots. *IEEE Transactions on Automatic Control*, 63(6): 1632-1647, June 2018. ISSN 2334-3303. doi: 10.1109/TAC.2017.2752085). Most of these works aim at a strict task decoupling.

The presented work is inspired by the family of Inverse Dynamics based tracking controllers that softly trade off a set of tasks (collected in a stack of tasks (SoT)) via a single weighted QP (M. A. Hopkins, D. W. Hong, and A. Leonessa. Compliant locomotion using whole-body control and divergent component of motion tracking. In IEEE Int. Conf. on Robotics and Automation (ICRA), pages 5726-5733, May 2015. doi: 10.1109/ICRA.2015.7140001, T. Koolen, S. Bertrand, G. Thomas, T. de Boer, T. Wu, J. Smith, J. Englsberger, and J. Pratt. Design of a Momentum-Based Control Framework and application to the humanoid robot atlas. *International Journal of Humanoid Robotics*, 13(01): 1650007, 2016. doi: 10.1142/S0219843616500079, J. Englsberger, G. Mesesan, A. Werner, and C. Ott. Torque-Based Dynamic Walking—a long way from simulation to experiment. In *IEEE Int. Conf on Robotics and Automation (ICRA)*, pages 440-447, 2018). Such controllers are straightforward to write and stand out due to their high flexibility. Yet, compared to passivity-based approaches such as (J. Peters, M. Mistry, F. Udwadia, J. Nakanishi, and S. Schaal. A unifying framework for robot control with redundant dofs. *Autonomous Robots*, 24: 1-12, 2008. doi: 10.1007/s10514-007-9051-x, A. Dietrich. Whole-Body Impedance Control of Wheeled Humanoid Robots, volume 116. Springer International Publishing, 2016. ISBN 978-3-319-40557-5, B. Henze, M. A. Roa, and Ch. Ott. Passivity-based whole-body balancing for torque-controlled humanoid robots in multi-contact scenarios. *The International Journal of Robotics Research*, 35(12):1522-1543, 2016. doi: 10.1177/0278364916653815, G. Mesesan, J. Englsberger, G. Garofalo, C. Ott, and A. Albu-Schaffer. Dynamic walking on compliant and uneven terrain using dcm and passivity-based whole-body control. In IEEE-RAS 19th *Int. Conf. on Humanoid Robots (Humanoids)*, pages 25-32, 2019, A. Dietrich and C. Ott. Hierarchical Impedance-Based tracking control of kinematically redundant robots. IEEE Transactions on Robotics, 36(1):204-221, 2020. ISSN 1941-0468. doi: 10.1109/TRO.2019.2945876), they are less robust w.r.t. modeling errors and contact uncertainties (J. Englsberger, G. Mesesan, A. Werner, and C. Ott. Torque-Based Dynamic Walking—a long way from simulation to experiment. In *IEEE Int. Conf on Robotics and Automation (ICRA)*, pages 440-447, 2018, A. Dietrich and C. Ott. Hierarchical Impedance-Based tracking control of kinematically redundant robots. *IEEE Transactions on Robotics*, 36(1):204-221, 2020. ISSN 1941-0468. doi: 10.1109/TRO.2019.2945876). This causes real-world issues such as vibrations, which are often addressed using heuristic approaches (M. A. Hopkins, D. W. Hong, and A. Leonessa. Compliant locomotion using whole-body control and divergent component of motion tracking. In *IEEE Int. Conf on Robotics and Automation (ICRA)*, pages 5726-5733, May 2015. doi: 10.1109/ICRA.2015.7140001, J. Englsberger, G. Mesesan, A. Werner, and C. Ott. Torque-Based Dynamic Walking—a long way from simulation to experiment. In *IEEE Int. Conf on Robotics and Automation (ICRA)*, pages 440-447, 2018).

Furthermore, the weighting based multi-objective controller in K. Bouyarmane and A. Kheddar. On Weight-Prioritized multitask control of humanoid robots. *IEEE Transactions on Automatic Control*, 63(6): 1632-1647, June 2018. ISSN 2334-3303. doi: 10.1109/TAC.2017.2752085 and the strictly hierarchical passivity-based controller from A. Dietrich and C. Ott. Hierarchical Impedance-Based tracking control of kinematically redundant robots. *IEEE Transactions on Robotics*, 36(1):204-221, 2020. ISSN 1941-0468. doi: 10.1109/TRO.2019.2945876 served as inspiration for this work. Similar to K. Bouyarmane and A. Kheddar. On Weight-Prioritized multitask control of humanoid robots. *IEEE Transactions on Automatic Control*, 63(6): 1632-1647, June 2018. ISSN 2334-3303. doi: 10.1109/TAC.2017.2752085 we use a QP to combine individual control actions from separate task space controllers. However, in K. Bouyarmane and A. Kheddar. On Weight-Prioritized multitask control of humanoid robots. *IEEE Transactions on Automatic Control*, 63(6): 1632-1647, June 2018. ISSN 2334-3303. doi: 10.1109/TAC.2017.2752085 each separate control action is computed based on ID with the unit matrix as the desired inertia (feedback linearization). In contrast, the individual task controllers presented here use the concept of passivity and avoid inertia shaping, i.e. we aim at a PD+ like closed-loop for each task (B. Paden and B. Riedle. A Positive-Real Modification of a class of nonlinear controllers for robot manipulators. In 1988 *American Control Conference*, pages 1782-1785, June 1988. doi: 10.23919/ACC.1988.4790015). Compared to A. Dietrich and C. Ott. Hierarchical Impedance-Based tracking control of kinematically redundant robots. *IEEE Transactions on Robotics*, 36(1):204-221, 2020. ISSN 1941-0468. doi: 10.1109/TRO.2019.2945876, which also preserves the natural inertia, we use a weighted QP formulation (soft prioritization), which allows us to blend an arbitrary number of different tasks and in certain situations (e.g. when a single task becomes singular) behaves less aggressively.

In this work, we derive a control architecture that is based on nominally passive subtask controllers, the so-called Modular Passive Tracking Controllers (MPTC). These are combined and traded off via a stack of tasks, which is solved via a single weighted pseudo-inverse or QP, respectively. The control framework combines the advantages of both Inverse Dynamics controllers and passivity-based controllers, namely: ease of implementation and use, task space tracking capabilities, passivity and contact robustness, and natural redundancy handling. The corresponding stability analysis is based on Lyapunov theory. For the non-conflicting case, the overall controller is found to be asymptotically stable and passive. An important contribution of the presented work is the derivation of a specific optimization weight that additionally preserves passivity even in the over-determined (i.e. conflicting) case. For competing tasks and corresponding inconsistent task references, multiple simulations and experiments show evidence of MPTC's stability and robustness even in the tracking case, while a formal stability proof is missing so far.

The paper is organized as follows: Section II derives the Modular Passive Tracking Controller (MPTC) at task level, while section III provides the overall closed-loop analysis and controller derivation. Section IV compares MPTC to Inverse Dynamics (ID) and PD+ based controllers, and presents the wide range of possible decoupling levels. Section V provides simulation and experimental results for both fixed-base and free-floating robots, while section VI concludes the paper.

II. Derivation of Modular Passive Tracking Control (MPTC)

This work considers $n_T$ tasks, each having its own individual objective. To satisfy the single-task objectives, this section derives Modular Passive Tracking Controllers (MPTC), which are combined into different overall controllers in Sec. III.

A. General Robot Model

The general robot equation of motion can be written as $$M(q)\ddot{q}+C(q,\dot{q})\dot{q}+\tau_g(q)=\tau \qquad (1)$$

where $q \in \mathbb{R}^n$ denotes the generalized coordinates (These are simply the joint coordinates in case of fixed-base robots (i.e.), while additionally containing the robot base coordinates (i.e.) in case of free-floating robots (e.g. humanoids)), $M(q), C(q,\dot{q})$ and $\tau_g(q)$ are the inertia matrix, Coriolis and centrifugal matrix, and gravitational torques, (Note: dependencies on q and $\dot{q}$ will be omitted below.) respectively, and $$\tau = S^T(\tau_j + \tau_{int}) + \underbrace{L_{all}^T w_{all}}_{\tau_{ext}} \quad (2)$$

denotes the generalized forces. These are composed of joint motor torques $\tau_j$ and internal perturbation torques $\tau_{int}$ acting in the robot joints (e.g. joint friction), which are both mapped to $\tau$ via the joint selection matrix S, (Note: S is a unit matrix for fixed base robots, while for free-floating robots $S=[0_{n_{acl}\times 6}, I_{n_{acl}\times n_{acl}}]$, where $n_{acl}$ denotes the number of actuated robot joints.) and of external torques $\tau_{ext}$. The latter are composed of all wrenches $w_{all}=[w_1^T, \ldots, w_{n_L}^T]^T$ acting on the $n_L$ robot links, which are mapped to $\tau$ via the stack of link Jacobians $L_{all}=[L_1^T, \ldots, L_{n_L}^T]^T$. While the single elements of (2) will be used in section III-E, in the following we will simply use $\tau$ to represent arbitrary generalized forces.

Solving (1) for the generalized accelerations $\ddot{q}$ yields $$\ddot{q} = M^{-1}(\tau - C\dot{q} - \tau_g) \quad (3)$$

B. Task Space Quantities

1) *Task space velocities and accelerations:* In robotic control, for typical task spaces (Typical tasks are joint level control, Cartesian end effector control, etc.) a task velocity vector $$\dot{x}_k = J_k \dot{q} \quad (4)$$

can be formulated. The index k indicates that such a mapping exists for all $n_T$ tasks, i.e. $k \in \{1, \ldots, n_T\}$. Here, $J_k \in \mathbb{R}^{n_{T,k} \times n}$ denotes the corresponding task Jacobian, with the dimensionality $n_{T,k}$ of the k-th task. Differentiating (4) with respect to time and inserting (3), we find the task space acceleration $$\ddot{x}_k = \dot{J}_k \dot{q} + J_k \ddot{q} = J_k M^{-1}(\tau - \tau_g) - Q_k \dot{q} \quad (5)$$

where $$Q_k = J_k M^{-1} C - \dot{J}_k \quad (6)$$

For the design of a tracking control law (see Sec. II-C), the corresponding task velocity error $$\dot{\tilde{x}}_k = \dot{x}_{k,ref} - \underbrace{J_k \dot{q}}_{\dot{x}_k} \quad (7)$$

and task acceleration error $$\ddot{\tilde{x}}_k = \ddot{x}_{k,ref} - \underbrace{(J_k M^{-1}(\tau - \tau_g) - Q_k \dot{q})}_{\ddot{x}_k} \quad (8)$$

are of particular interest. Here, $\dot{x}_{k,ref}$ and $\ddot{x}_{k,ref}$ denote the task reference velocity and acceleration, respectively.

2) *Task space inertia and its derivative:* Using $J_k$, the inertia matrix M can be projected into the task space [17]:

$$M_k = (J_k M^{-1} J_k^T)^{-1} \quad (9)$$

Differentiating (9) yields $$\dot{M}_k = -M_k \left( \dot{J}_k M^{-1} J_k^T - J_k M^{-1} \underbrace{\dot{M} M^{-1}}_{C+C^T} J_k^T + J_k M^{-1} \dot{J}_k^T \right) M_k = C_k C_k^T, \quad (10)$$

with the task space Coriolis and centrifugal matrix $$C_k = M_k Q_k T_k^T \quad (11)$$

The matrix $$T_k = M_k J_k M^{-1} \quad (12)$$

is the dynamically consistent pseudo-inverse of $J_k^T$.

C. Modular Passive Tracking Controller (MPTC)

This section derives the proposed Modular Passive Tracking Controller (MPTC). It is written in generic form, serving as template for arbitrary specific controllers (e.g. Cartesian or joint controllers). For each one of then $n_T$ tasks, we use a separate Lyapunov function based on the task-related relative kinetic energy $E_{kin,k}$ and relative potential energy $E_{pot,k}$:

$$V_k = \underbrace{\frac{1}{2} \dot{\tilde{x}}_k^T M_k \dot{\tilde{x}}_k}_{E_{kin,k}} + \underbrace{\frac{1}{2} \tilde{x}_k^T K_k \tilde{x}_k}_{E_{pot,k}}, \quad (13)$$

where the positive definite, symmetric matrix $K_k$ denotes the task stiffness. This Lyapunov function is positive definite in the task position error $\tilde{x}_k$ and the task velocity error $\dot{\tilde{x}}_k$.

Now we differentiate (13) and insert (8), which yields:

$$\dot{V}_k = \dot{\tilde{x}}_k^T \left( M_k \ddot{\tilde{x}}_k + \frac{\dot{M}_k}{2} \dot{\tilde{x}}_k + K_k \tilde{x}_k \right) =$$

$$\dot{\tilde{x}}_k^T \left( \underbrace{M_k J_k M^{-1}}_{T_k} (\tau_g - \tau) + M_k Q_k \dot{q} + M_k \ddot{x}_{k,ref} + C_k \dot{\tilde{x}}_k + K_k \tilde{x}_k \right). \quad (14)$$

Here, we made use of the equality $$\frac{\dot{M}_k}{2} = \frac{C_k^T + C_k}{2} = \underbrace{\frac{C_k^T + C_k}{2}}_{skew-symmetric} + C_k, \quad (15)$$

which allows us to rewrite $\dot{\tilde{x}}_k^T \dot{M}_k/2 \, \dot{\tilde{x}}_k$ as $\dot{\tilde{x}}_k^T C_k \dot{\tilde{x}}_k$, since the skew-symmetric term cancels.

We now define the (actual) taskforce (Note: depending on the task, the task force may contain linear forces, torques, wrenches, etc.) $f_k$ as:

$$f_k = T_k \tau \quad (16)$$

By choosing the desired taskforce $f_{k,des}$ (Note: this desired task force $f_{k,des}$ will be used as task-specific controller objective in section III. Also note: in Sec. IV-B, we provide an alternative (yet equivalent) controller formulation (55), which better unveils the controller's similarity to a PD+ formulation.) as $$f_{k,des} = T_k \tau_g + M_k Q_k \dot{q} + M_k \ddot{x}_{k,ref} + (C_k + D_k) \dot{\tilde{x}}_k + K_k \tilde{x}_k \quad (17)$$

and rewriting $T_k \tau$ as $$T_k \tau = f_k = f_{k,des} - \underbrace{(f_{k,des} - f_k)}_{\tilde{f}_k}, \quad (18)$$

the single task Lyapunov rate from (14) becomes $$\dot{V}_k = -\underbrace{\dot{\tilde{x}}_k^T D_k \dot{\tilde{x}}_k}_{\dot{V}_{k,des},\text{ purely dissipative}} + \underbrace{\dot{\tilde{x}}_k^T \tilde{f}_k}_{\hat{V}_k}. \quad (19)$$

Note that the controlled system (at task level) is passive with respect to input $\tilde{f}_k$ output $\dot{\tilde{x}}_k$ and the storage function $V_k$ from (13). While the desired Lyapunov rate $\dot{V}_{k,des}$ is purely dissipative for a positive definite damping matrix $D_k$, the term $\hat{V}_k$ may be non-zero, depending on factors including unknown perturbations, under-actuation and other actuation limits, task inconsistencies and prioritization. Finally, we premultiply (8) by $M_k$, insert (18) and (17), simplify and reorder to obtain a task dynamics of the form $$M_k \ddot{\tilde{x}}_k + (C_k + D_k) \dot{\tilde{x}}_k + K_k \tilde{x}_k = \tilde{f}_k. \quad (20)$$

Note that the task related Coriolis term (i.e. $C_k \dot{\tilde{x}}_k$) has not been cancelled, which is a prerequisite for passivity. If the desired task force is achieved (i.e. $\tilde{f}_k = 0$), equation (20) corresponds to a spring-mass-damper dynamics for task k. For non-conflicting tasks, one can show asymptotic stability of all trajectories. That can be achieved, for example, by invoking the ε-method (R. M. Murray. A mathematical introduction to robotic manipulation. CRC press, 2017), to obtain a strong Lyapunov function with negative definite time derivative, similar to (A. Dietrich and C. Ott. Hierarchical Impedance-Based tracking control of kinematically redundant robots. IEEE Transactions on Robotics, 36(1): 204-221, 2020. ISSN 1941-0468. doi: 10.1109/ TRO.2019.2945876).

Otherwise, e.g. in case of under-actuation or other actuation limits, unexpected external perturbations or task inconsistencies, (20) corresponds to a compliance (Remember: compliance means an impedance behavior with natural inertia (no inertia shaping) behavior (A. Dietrich, C. Ott, and A. Albu-Schäffer. Multi-objective compliance control of redundant manipulators: hierarchy, control, and stability. In *IEEE/RSJ Int. Conf on Intelligent Robots and Systems*, pages 3043-3050, November 2013. doi: 10.1109/ IROS.2013.6696787). For such cases, further analysis may become necessary. In this work, we focus on the problem of task inconsistencies, which will be addressed in the subsequent section.

III. Overall Closed-Loop Analysis and Control

In this section, we derive controllers for the overall system of subtask controllers, i.e. for the complete set of desired task forces $f_{k,des}$ from (17) for $k \in \{1, \ldots, n_T\}$, and analyze their closed-loop behaviors by applying Lyapunov theory.

A. Definition of Different Task Force Errors

Stacking all desired task forces $f_{k,des}$ from (17) fork $k \in \{1, \ldots, n_T\}$ yields $$f_{des} = \begin{bmatrix} f_{1,des} \\ \vdots \\ f_{n,des} \end{bmatrix}. \quad (21)$$

Similarly, we stack (16) for $k \in \{1, \ldots, n_T\}$ to obtain $$\underbrace{\begin{bmatrix} f_1 \\ \vdots \\ f_{n_T} \end{bmatrix}}_{f} = \underbrace{\begin{bmatrix} T_1 \\ \vdots \\ T_{n_T} \end{bmatrix}}_{T} \tau. \quad (22)$$

This is the mapping from the actual generalized forces $\tau$ to the stack of actual taskforces f via the corresponding collected task mapping matrix $T \in \mathbb{R}^{n_{T,all} \times n}$, where the sum overall subtask dimensionalities is denoted by $$n_{T,all} = \sum_{k=1}^{n_T} n_{T,k}.$$

Now, we define the stack of actual task force errors $$\tilde{f} = f_{des} - f = f_{des} - T\tau \quad (23)$$

Next, to facilitate discussions about commanded taskforces and corresponding errors, we evaluate (22) for the commanded generalized forces $\tau_{cmd}$ from some controller (Possible controllers may, for example, use pseudo-inverse based optimization as in (36) for unconstrained control problems or quadratic programming (QP) based optimization (see Sec. III-E) to handle inequality constraints), which yields the stack of commanded task forces $$f_{cmd} = \begin{bmatrix} f_{1,cmd} \\ \vdots \\ f_{n_T,cmd} \end{bmatrix} T \tau_{cmd} = \underline{T U}_{T_u} u_{cmd}, \quad (24)$$

For certain control problems (including under-actuation, see Sec. III-E), $\tau_{cmd}$ may result from the given optimization variables $u_{cmd}$, which are mapped to corresponding generalized forces via the actuation mapping matrix U, i.e. $\tau = U u_{cmd}$.

Finally, subtracting (24) from (21), we obtain the corresponding stack of task force command errors:

$$\tilde{f}_{cmd} = f_{des} - f_{cmd} = f_{des} - T\tau_{cmd} = f_{des} - T_u u_{cmd} \quad (25)$$

B. Definition of Overall System Lyapunov Function, and its Actual and Commanded Derivatives In this section, we will analyze the stability and passivity of complete sets of modular task space controllers (and thus the stability of the complete robot system dynamics, if all robot DOF are covered by the collection of task coordinates). To this end, we combine all single task Lyapunov functions (13) to construct the following overall Lyapunov function $$V = \sum_{k=1}^{n_T} (\psi_k V_k), \quad (26)$$

which for positive scalar weights (Note: These positive scalar weights are equivalent to the optimization weights used in (34), (41).) $\psi_k > 0$ is positive definite (just like its input elements $V_k$). Correspondingly, the overall Lyapunov function derivative $\dot{V}$ is obtained by combining the single task Lyapunov derivatives $\dot{V}_k$ from (19):

$$\dot{V} = \sum_{k=1}^{n_T} (\psi_k \dot{V}_k) = \underbrace{\sum_{k=1}^{n_T} (\psi_k \dot{V}_{k,des})}_{\dot{V}_{des}} + \underbrace{\sum_{k=1}^{n_T} (\psi_k \dot{\tilde{V}}_k)}_{\dot{\tilde{V}}}. \quad (27)$$

The term $\dot{V}_{des}$ is negative semi-definite if all $\psi_k > 0$, since all desired task Lyapunov rates $\dot{V}_{k,des}$ are negative semi-definite. The actual overall Lyapunov rate error $\dot{\tilde{V}}$ can be written as $$\dot{\tilde{V}} = \dot{\tilde{x}}^T \underbrace{\begin{bmatrix} \psi_1 I & \cdots & 0 \\ \vdots & \ddots & \vdots \\ 0 & \cdots & \psi_{n_y} I \end{bmatrix}}_{\Psi} \tilde{f}, \quad (28)$$

where $\dot{\tilde{x}}^T = [\dot{\tilde{x}}_1^T, \ldots, \dot{\tilde{x}}_{n_T}^T]$. Note: $\dot{\tilde{V}}$ is a function of $\tilde{f}$ and thus also of the actual generalized forces $\tau$.

We will now additionally examine the effect of the stack of commanded task force errors $\tilde{f}_{cmd}$. Adapting (28) correspondingly, we find the commanded overall Lyapunov rate error $$\dot{\tilde{V}}_{cmd} = \dot{\tilde{x}}^T \Psi \tilde{f}_{cmd} \quad (29)$$

which corresponds to the commanded overall Lyapunov rate $$\dot{V}_{cmd} = \dot{V}_{des} + \underbrace{\sum_{k=1}^{n_T} (\psi_k \dot{\tilde{V}}_{k,cmd})}_{\dot{\tilde{V}}_{cmd}}, \quad (30)$$

where $\dot{\tilde{V}}_{k,cmd} = \dot{\tilde{x}}_k^T \tilde{f}_{k,cmd}$. Finally, we reformulate (28) as $$\dot{\tilde{V}} = \dot{\tilde{x}}^T \Psi (f_{des} - f) \quad (31)$$

$$= \dot{\tilde{x}}^T \Psi (f_{des} - f_{cmd}) + \underbrace{\dot{\tilde{x}}^T \Psi (f_{cmd} - f)}_{\dot{\tilde{V}}_{real}},$$

which corresponds to the overall actual Lyapunov derivative $$\dot{V} = \dot{V}_{des} + \dot{\tilde{V}}_{cmd} + \dot{\tilde{V}}_{real} \quad (32)$$

that relates to the real system behavior. Here, $$\dot{\tilde{V}}_{real} = \dot{\tilde{x}}^T \Psi (f_{cmd} - f) \quad (33)$$

denotes the component of the Lyapunov rate error that corresponds to deviations $\tilde{f}_{real}$ of the commanded task forces $f_{cmd}$ from the actual ones $f$.

C. Overall Cost Function

Based on $\tilde{f}_{cmd}$ from (25), we formulate an overall cost function $$\begin{aligned} G &= \frac{1}{2} \tilde{f}_{cmd}^T W \tilde{f}_{cmd} \\ &= \frac{1}{2} \tau_{cmd}^T T^T W T \tau_{cmd} - f_{des}^T W T \tau_{md} + \frac{1}{2} f_{des}^T W f_{des} \\ &= \frac{1}{2} u_{cmd}^T T_u^T W T_u u_{cmd} - f_{des}^T W T_u u_{cmd} + \frac{1}{2} f_{des}^T W f_{des} \end{aligned} \quad (34)$$

Here, W denotes an arbitrary symmetric and positive-definite weighting matrix. This cost function G will be minimized by the different controllers presented in sections III-D and III-E.

D. Unconstrained and Fully Actuated Case

1) Pseudo-inverse based general analytical optimization:
This section considers the fully actuated, unconstrained and potentially conflicting case. The lack of inequality constraints facilitates an analytical solution via weighted pseudo-inverse, while the full actuation guarantees controllability and allows to directly use the commanded generalized forces $\tau_{cmd}$ as optimization variables. In this case, to optimize the cost function (34, second line), we differentiate G w.r.t. $\tau_{cmd}$:

$$dG/d\tau_{cmd} = \tau_{cmd}^T T^T W T - f_{des}^T W T. \quad (35)$$

The cost function (34) is minimized by setting (35) to zero and solving for the controller torques $\tau_{cmd}$ $$\tau_{cmd} = (T^T W T)^{-1} T^T W f_{des}, \quad (36)$$

which are the optimal torque commands for the given problem statement. Inserting (36) in (25)

$$\tilde{f}_{cmd} = \underbrace{(I - T(T^T W T)^{-1} T^T W)}_{E_T} f_{des}, \quad (37)$$

where $E_T$ denotes the taskforce trade-off matrix.

2) Non-conflicting case: If T is square and invertible (i.e. all subtasks are independent from each other and thus nonconflicting), the trade-off matrix from (37) becomes $E_T = 0$, and the task force command errors become $\tilde{f}_{cmd} = 0$. In this case, $\dot{\tilde{V}}_{cmd}$ from (29) is also zero, and thus $\dot{V}$ from (32) becomes $$\dot{V} = \dot{V}_{des} + \dot{\tilde{V}}_{real} \quad (38)$$

3) Conflicting case: If, in contrast, T is non-invertible (e.g. in over-determined controller setups), the trade-off matrix $E_T$ is non-zero. Inserting (37) into (29), we find the corresponding commanded overall Lyapunov rate error $$\dot{\tilde{V}}_{cmd} = (\dot{x}_{ref}^T - \dot{q}^T J^T) \Psi E_T f_{des} \quad (39)$$

Here, $J = [J_1^T, \ldots, J_{n_T}^T]^T$ is a stack of single task Jacobians. Considering the conflicting regulation case (i.e. $\dot{x}_{ref} = 0$) first, we examine the matrix $J^T \Psi E_T$, which appears in (39):

$$\begin{aligned} J^T \Psi E_T &= J^T \Psi (I - T(T^T W T)^{-1} T^T W) \\ &= J^T \Psi (I - \Lambda J(J^T \Lambda W \Lambda J)^{-1} J^T \Lambda W). \end{aligned} \quad (40)$$

Here, we inserted $T = \Lambda J M^{-1}$, where $\Lambda$ is a block-diagonal matrix with the task space inertia matrices $\{M_1, \ldots, M_{n_T}\}$ as its diagonal submatrices. For an arbitrary choice of W, (even if it is chosen to be diagonal, as often found in the Inverse Dynamics (ID) related literature) (40) is a non-zero matrix, such that $\dot{V}_{cmd}$ from (39) is non-zero, even in the regulation case. However, for the choice $$W = \Lambda^{-1}\Psi \qquad (41)$$

equation (40) becomes $$J^T \Psi E_T = J^T \Psi - \underbrace{J^T \Psi \Lambda J (J^T \Psi \Lambda J)^{-1}}_{I} J^T \Psi = 0. \qquad (42)$$

This means that (independently from the current generalized velocities $\dot{q}$ and desired task forces $f_{des}$) for the choice (41) the commanded Lyapunov rate $\dot{V}_{cmd}$ from (39) becomes $$\dot{V}_{cmd} = 0 \qquad (43)$$

in the regulation case $\dot{V}_{cmd}$, and $\dot{V}$ from (32) becomes $$\dot{V} = \dot{V}_{des} + \dot{V}_{real} \qquad (44)$$

Looking at the elements of (44), we find that the overall controlled system is passive with respect to the input $\Psi f_{real}$, the output $\dot{x}$ (these two being the elements of $\dot{V}_{real}$) and the positive definite storage function V from (26). Thus, we conclude passivity of the overall system in the conflicting regulation case examined here. For the overall system closed-loop dynamics of over-determined/conflicting task setups (regulation case), (41) acts as Passivity Warranting Optimization Weight (PWOW). Note, (43) does not mean that the single task Lyapunov rate errors $\dot{V}_{k,end}$ are zero (only their sum).

The overall weighting matrix $W = \Lambda^{-1}\Psi$ from (41) is symmetric and block-diagonal. Its symmetry property results from the symmetry of its diagonal sub-matrices $$W_k = \Psi_k M_k^{-1} \qquad (45)$$

which are a function of $\Psi_k$ and the inverse of the (symmetric) task inertia matrix $M_k$. Looking at (45), it becomes clear that each task can still be weighted independently (w.r.t. other tasks) via its corresponding weighting scalar $\Psi_k$.

Now, we consider the conflicting tracking case. For $\dot{x}_{ref} \neq 0$ and still applying (41), (39) turns into $$\dot{V}_{cmd} = \dot{x}_{ref}^T \Psi E_T f_{des} \qquad (46)$$

for which equation (32) becomes $$\dot{V} = \dot{V}_{des} + \underbrace{\dot{x}_{ref}^T \Psi E_T f_{des} + \dot{V}_{real}}_{\dot{V}_{cmd}}. \qquad (47)$$

For inconsistent task reference velocities, $\dot{V}_{cmd}$ will typically be non-zero, which renders a formal passivity proof for the tracking case more difficult (out of the scope of this paper).

E. Handling Under-Actuation and Other Actuation Constraints

The analytical solutions presented in the previous section are dedicated to control problems that assume fully actuated robots, whose actuation limits (or other constraints) are not relevant. This section will treat the cases of under-actuation and actuation constraints, and propose a solution for such control problems in the MPTC context.

1) Under-actuation: In contrast to fixed-base robots, the robot base of free-floating robots (e.g. humanoids) is not actuated. Instead, in order to achieve a certain degree of controllability, a free-floating robot needs to use its end effectors to create contact wrenches that compensate for the lack of a direct base actuation. The corresponding actuation mapping matrix U from Sec. III-A has the following form:

$$U = [S^T, L_{EE}^T] \qquad (48)$$

The related actuation DOF/optimization variables are $$u_{cmd} = \begin{bmatrix} \tau_{j,cmd} \\ w_{EE,cmd} \end{bmatrix}, \qquad (49)$$

where $\tau_{j,cmd}$ denotes the commanded joint torques and $w_{EE,cmd}$ are the commanded end effector wrenches. Equations (48) and (49) are based on elements from equation (2). Note however that here we replaced the collection of all link Jacobians $L_{all}$ and link wrenches $w_{all}$ by a selection that corresponds to the contacting end effectors ("EE"), i.e. by $L_{EE}$ and $w_{EE,cmd}$.

2) contact and actuation constraints: The commanded end effector wrenches, $w_{EE,cmd}$ just introduced are often subject to inequality constraints (the so-called "contact constraints"). As an example, in walking related applications (see Sec. V-B) these contact constraints are typically expressed in the form of unilaterality and friction cone constraints. Omitting such contact constraints may lead to a failure of the robot. Additionally, due to the physical limitations of the robot, it often makes sense to also constrain the commanded joint torques $\tau_{j,cmd}$. This way, actuator saturation may be avoided.

3) solution via quadratic programming (QP): A popular method that allows us to handle the mentioned problems of under-actuation, actuation limits and contact constraints is to set up a quadratic program (QP) of the form (More explicit QP constraint formulations can be found e.g. in [L. Righetti, J. Buchli, M. Mistry, and S. Schaal. Inverse dynamics control of floating-base robots with external constraints: A unified view. In IEEE Int. Conf. on Robotics and Automation, pages 1085-1090, May 2011. doi: 10.1109/ICRA.2011.5980156, T. Koolen, S. Bertrand, G. Thomas, T. de Boer, T. Wu, J. Smith, J. Englsberger, and J. Pratt. Design of a Momentum-Based Control Framework and application to the humanoid robot atlas. *International Journal of Humanoid Robotics*, 13(01):1650007, 2016. doi: 10.1142/S0219843616500079, J. Englsberger, G. Mesesan, A. Werner, and C. Ott. Torque-Based Dynamic Walking—a long way from simulation to experiment. In IEEE Int. Conf. on Robotics and Automation (ICRA), pages 440-447, 2018)

$$\underset{u_{cmd}}{\text{minimize}} \ G_{QP} = \frac{1}{2} u_{cmd}^T T_u^T W T_u u_{cmd} - f_{des}^T W T_u u_{cmd}, \qquad (50)$$

subject to contact and joint torque constraints.

Here, the third line of (34) was adapted for the formulation of the QP cost function $G_{QP}$. It is well-known, that a QP provides the same solution as a weighted pseudo-inverse based optimization, as long the constraints are not active. We propose to use the exact same Passivity Warranting Optimization Weight (PWOW) that was applied in Sec. III-D for the analytical optimization, i.e. $W = \Lambda^{-1} \Psi$. Note however that, as soon as the constraints become active, passivity can no longer be guaranteed; even in the regulation case.

IV. Placement Among Related Controller Types and Granularity of Targeted Decoupling

A. Comparison of Inverse Dynamics (JD) and MPTC

In this section, we compare the objectives of Inverse Dynamics (ID) based controllers and MPTC-based controllers, and show major similarities.

Inverse Dynamics (ID):

Inverse Dynamics (ID) based controllers typically implement a stable second order dynamics of the form $$\ddot{x}_k = \ddot{x}_{k,ref} + \hat{D}_{ID,k}\underbrace{(\dot{x}_{k,ref} - \dot{x}_k)}_{\dot{\tilde{x}}_k} + \hat{P}_{ID,k}\underbrace{(x_{k,ref} - x_k)}_{\tilde{x}_k}, \quad (51)$$

which enables the tracking of the reference motion $x_{k,ref}$, $\dot{x}_{k,ref}$, $\ddot{x}_{k,ref}$ for positive definite proportional and derivative gain matrices $\hat{P}_{ID,k}$ and $\hat{D}_{ID,k}$. These two gain matrices are typically designed as diagonal matrices in order to obtain a fully decoupled, linear dynamics. Oftentimes, pole placement (J. Ackermann. Parameter space design of robust control systems. *IEEE Transactions on Automatic Control*, 25 (6): 1058-1072, December 1980. ISSN 2334-3303. doi: 10.1109/TAC.1980.1102505) is used to achieve a critically damped transient response. Inserting the task space acceleration $\ddot{x}_k$ from (5) into (51), and solving for the term related to the generalized forces $\tau$ yields:

$$J_k M^{-1}\tau = J_k M^{-1}\tau_g + Q_k\dot{q} + \ddot{x}_{k,ref} + \hat{D}_{ID,k}\dot{\tilde{x}}_k + \hat{P}_{ID,k}\tilde{x}_k. \quad (52)$$

Note that we do not solve for $\tau$ directly here, since, depending on the chosen controller setup, $J_k$ may not be invertible.

Modular Passive Tracking Control (MPTC):

By replacing $f_{k,des}$ in (17) by $f_k = T_k\tau$ (from (16)), premultiplying the result with $M_k^{-1}$ and reordering, we find the following desired task control action:

$$J_k M^{-1}\tau = J_k M^{-1}\tau_g + Q_k\dot{q} + \ddot{x}_{k,ref} + \underbrace{M_k^{-1}(C_k + D_k)}_{\hat{D}_{MPTC,k}}\dot{\tilde{x}}_k + \underbrace{M_k^{-1}K_k}_{\hat{P}_{MPTC,k}}\tilde{x}_k. \quad (53)$$

When comparing (53) to (52), we find that the basic structure of the presented Modular Passive Tracking Controller (MPTC) and Inverse Dynamics (ID) based controllers is the same. They only differ by the chosen proportional and derivative gain matrices. For ID based controllers, $\hat{P}_{ID,k}$ and $\hat{D}_{ID,k}$ are designed to be constant, whereas, in case of MPTC, $\hat{P}_{MPTC,k}$ and $\hat{D}_{MPTC,k}$ are a function of the current task inertia $M_k$. Additionally, $\hat{D}_{MPTC,k}$ contains the task Coriolis matrix $C_k$, such that the task related Coriolis terms are not canceled, which is a prerequisite for passivity and increases robustness (This is due to the reduced number of feedback channels that may cause problems related to sensor noise and modeling errors.).

It is important to note, that (52) and (53) are denoted in task acceleration space, where for ID we find constant gain matrices, which correspond to constant system/task eigenvalues, while the local eigenvalues of MPTC are configuration-dependent. If, in contrast, (52) and (53) are transferred into task force space by premultiplying them with $M_k$, we find that the perceived damping and stiffness are constant in case of MPTC, while being configuration dependent for ID.

Remark: The strong similarity between (52) and (53) may be advantageous with regard to a potential porting of existing ID-based controller frameworks to the MPTC methodology.

B. Comparison to PD+ Control I Passivity-Based WBC

Reordering those terms in the subtask controller objective (17) that are related to Coriolis and centrifugal (from here on abbreviated as "CC") effects, we find the following equality:

$$C_k\dot{\tilde{x}}_k + M_k Q_k \dot{q} = C_k\dot{x}_{k,ref} + \underbrace{M_k Q_k (I - T_k^T J_k)\dot{q}}_{B_k}. \quad (54)$$

Here, $N_k$ denotes a nullspace projector that cancels out all components of $\dot{q}$ that would have an effect on the task-space velocity $\dot{x}_k$, and the matrix $B_k$ collects the corresponding CC related feedback terms. Inserting (54) in (17), we find an alternative (yet equivalent) subtask controller formulation:

$$f_{k,des} = T_k\tau_g + B_k\dot{q} + M_k\ddot{x}_{k,ref} + C_k\dot{x}_{k,ref} + D_k\dot{\tilde{x}}_k + K_k\tilde{x}_k \quad (55)$$

As compared to the original subtask controller formulation from (17), this formulation enables a more straightforward insight into the CC term cancellation policy of the MPTC controller: MPTC cancels out all non-task-related CC feedback terms (comparable to off-diagonal terms in (A. Dietrich, C. Ott, and A. Albu-Schäffer. Multi-objective compliance control of redundant manipulators: hierarchy, control, and stability. In *IEEE/RSJ Int. Conf on Intelligent Robots and Systems*, pages 3043-3050, November 2013. doi: 10.109/IROS.2013.6696787)) and provides a task-related feedforward term $C_k\dot{x}_{k,ref}$, while not canceling/utilizing task-related CC feedback terms. The latter can also be verified by revisiting the nominal subtask closed-loop behavior (20), in which the task-related CC terms remain unaffected. Maintaining the task-related CC terms is a prerequisite for passivity, and leads to a higher robustness against modeling errors as compared to Inverse Dynamics based controllers. The latter completely cancel all CC effects (based on the potentially inaccurate robot model), while MPTC-based controllers cancel only the non-task-related CC terms.

Figure 1:
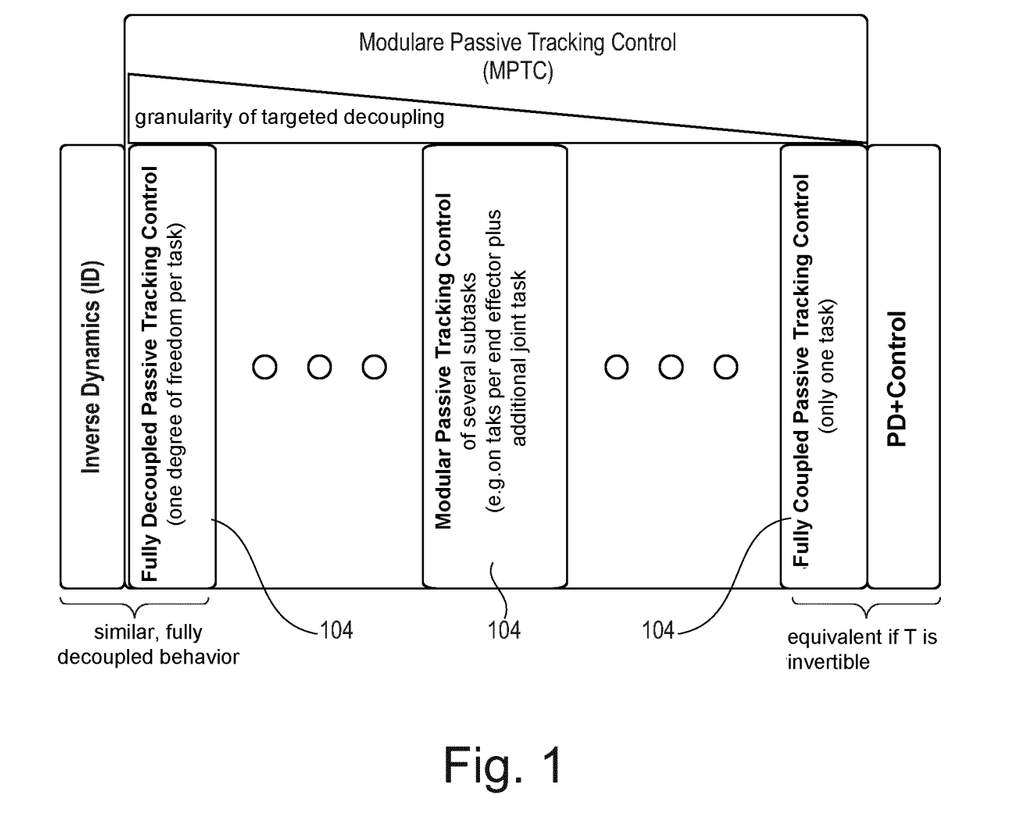
FIG. 1 shows that MPTC covers the complete range between inverse dynamics (ID) and PD+ control.

An interesting special case is, when only one task is considered (combining all subtasks into an overall task by stacking the corresponding subtask Jacobians) and the task Jacobian $J_k$ is square and invertible. This requires the subtasks to be non-conflicting. In this particular case, $B_k=0$ and thus (55) is equivalent to a classic PD+ controller (J. Peters, M. Mistry, F. Udwadia, J. Nakanishi, and S. Schaal. A unifying framework for robot control with redundant dofs. Autonomous Robots, 24: 1-12, 2008. doi: 10.1007/s10514-007-9051-x) (see FIG. 1) or (in case of inequality constraints) to more recently introduced passivity-based whole-body controllers (WBC) (B. Henze, M. A. Roa, and Ch. Ott. Passivity-based whole-body balancing for torque-controlled humanoid robots in multi-contact scenarios. *The International Journal of Robotics Research*, 35(12):1522-1543, 2016. doi: 10.1177/0278364916653815, G. Mesesan, J. Englsberger, G. O, C. Ott, and A. Albu-Schäffer. Dynamic walking on compliant and uneven terrain using dcm and passivity-based whole-body control. In IEEE-RAS 19th Int. Conf. on Humanoid Robots (Humanoids), pages 25-32, 2019).

C. Granularity of Targeted Decoupling

MPTC is a generic controller design tool, both w.r.t. the choice of sub-controller types (e.g. Cartesian vs. joint control) and w.r.t. the "granularity" of the targeted decoupling (Note: we are talking here about "targeted decoupling". In case of consistent tasks, MPTC yields a strictly decoupled error dynamics. However, in case of inconsistencies, a coupling between the respective task error dynamics is inevitable (at least for soft task prioritization)). When speaking about subtasks, we never specified their respective dimensions, i.e. the number of DOF that each task covers. This means there are many conceivable controller configurations. Collecting different control objectives (e.g. a Cartesian end effector tracking objective and a joint control one) into a single stack of tasks (SoT), the question remains open, which parts of the SoT should be assigned to what MPTC-related subtasks. As an example: a six-DOF Cartesian task can be defined as two decoupled (linear and angular) controller subtasks, or alternatively as a single six-DOF task. In the first case, the linear and angular error dynamics would be decoupled from each other, while in the second case they would be coupled.

One may also decide to combine all control objectives into a single task (resulting in a Fully Coupled Passive Tracking Controller (FC-PTC)), which under certain circumstances is equivalent to a PD+ controller (see Sec. IV-B and FIG. 1). Alternatively, one may define a set of multiple natural tasks (e.g. one task for the left foot, one for the right), which can be treated by the standard MPTC framework. Finally, one may decide to design a maximally granular controller setup, in which each line of the SoT forms a single task. We refer to this particular type of controller setup by Fully Decoupled Passive Tracking Controller (FD-PTC). Out of all possible MPTC setups, FD-PTC is the one that is most similar to an Inverse Dynamics controller; both are based on single-DOF decoupled task dynamics (see FIG. 1). However, FD-PTC can be expected to behave more robustly due to the absence of inertia shaping and reduced CC term cancellation.

Remember that there is only one single weighting scalar $\psi_k$ per task, that allows for (softly) prioritizing the tasks amongst each other. This decreases the required tuning efforts. Note however, that to independently increase the priority of a certain task component (e.g. prefer the z-direction over the x and y components of a Cartesian task), it needs to be assigned to an own task and an appropriate weight (e.g. $\psi_z$).

V. Simulations and Experiments

In order to validate the performance of our proposed MPTC framework, we performed several simulations and experiments: on the one hand simple simulations based on a forward integration of (3) that used the computed controller torques as input, on the other hand simulations (using OpenHRP (F. Kanehiro, H. Hirukawa, and S. Kajita. Openhrp: Open Architecture Humanoid Robotics Platform. *The International Journal of Robotics Research*, 23(2): 155-165, 2004. doi: 10.1177/0278364904041324) as simulation environment) and experiments with the full-sized humanoid robot TORO (J. Englsberger, A. Werner, C. Ott, B. Henze, M. A. Roa, G. Garofalo, R. Burger, A. Beyer, O. Eiberger, K. Schmid, and A. Albu-Schäffer. Overview of the torque-controlled humanoid robot TORO. In *IEEE-RAS Int. Conf on Humanoid Robots*, pages 916-923, November 2014. doi: 10.1109/HUMANOIDS.2014.7041473).

A. Fixed-Base Robot Simulations

Figure 2:
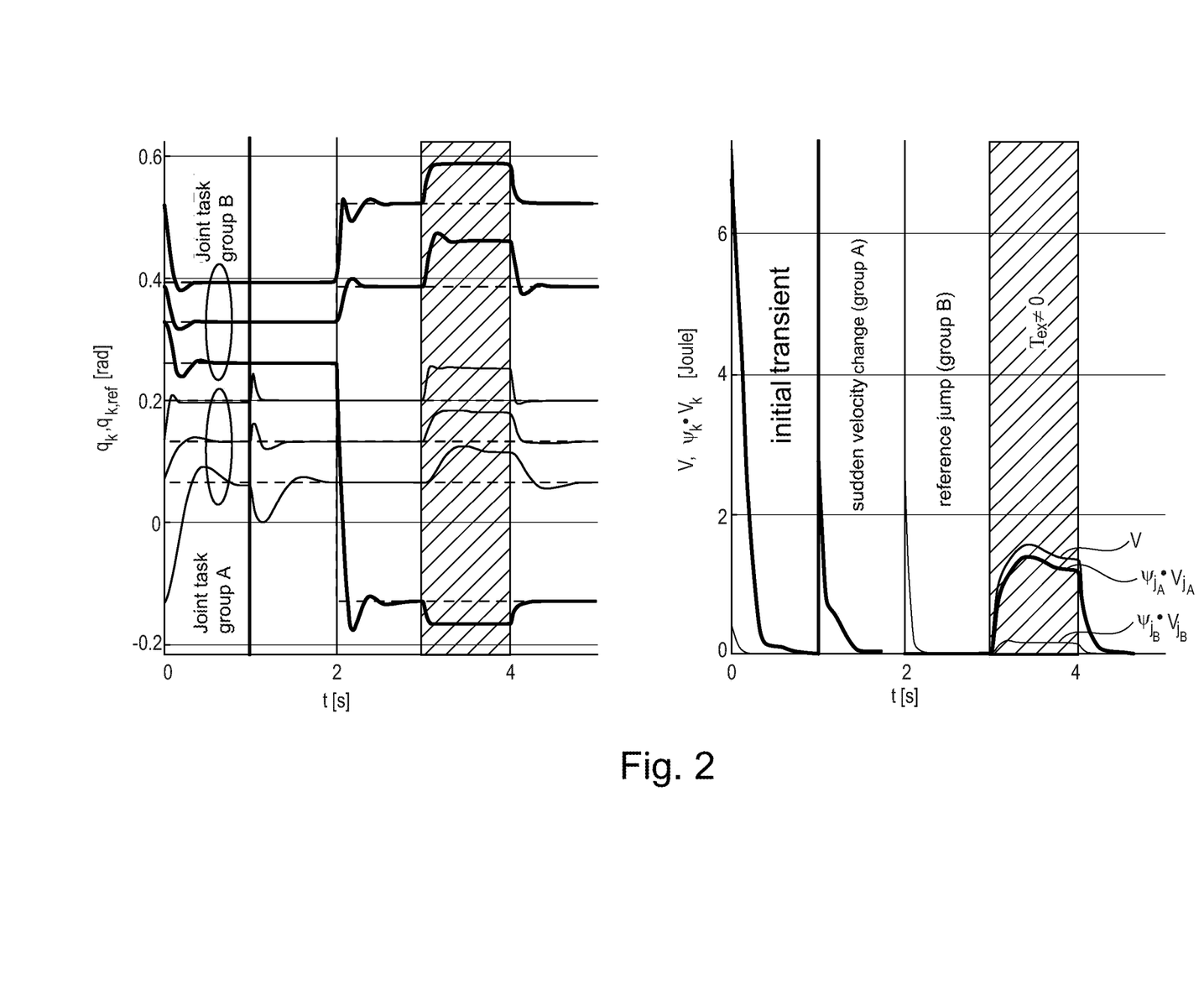
FIG. 2 shows transient responses for a fully determined and nonconflicting task setup. Left: joint angles and references. Right: overall and task-specific Lyapunov function values.

The first presented simulation is designed to examine the regulation case for a fully actuated, fully determined and thus non-conflicting task setup. To this end, the six joints of a fixed-base robot arm (whose kinematics and inertia properties correspond to one of TORO's legs) were assigned to two different joint tasks A and B (each covering three joints, see FIG. 2). The corresponding joint task stiffness and damping gains (Note: for brevity, the units for stiffness (linear:, angular:) and damping (linear:, angular: are omitted here) 14 were chosen as $K_A=300I_{3\times 3}$, $D_A=\text{diag}([40, 20, 10])$, $K_B=40I_{3\times 3}$ and $D_B=2I_{3\times 3}$, respectively. Note that the scalar task weights $\psi_k$ (here all set to 1) are without effect, since due to the lack of conflicts all tasks were perfectly fulfilled anyway. It has to be noted, that the controller did not require any additional tuning. The presented parameters were chosen to improve the educational value of FIG. 2. At the beginning of the simulation, all joints rapidly converge to the initial setpoints. After one second, the joints from group A were subject to a velocity change, resulting in a jump in the corresponding task error derivatives. Note that, while group A converges back, group B is completely unaffected due to the task decoupling. After two seconds, the setpoints of group B are changed. Again, the corresponding joint coordinates converge, while now group A is completely unaffected. Note: the perfect task decoupling observed here was only achievable due to the consistency of the two joint tasks. Finally, after three seconds a torque offset of $\tau_{ext}=[20, 20, 20, 5, 5, 5]$Nm is applied first and then removed at 4 s. Again the observed controller behavior is good-natured and fulfills our expectations. Using this simulation, we can verify that the overall Lyapunov function value V always decreases, except for the case of perturbations and setpoint changes (see FIG. 2 (right)).

Figure 3:
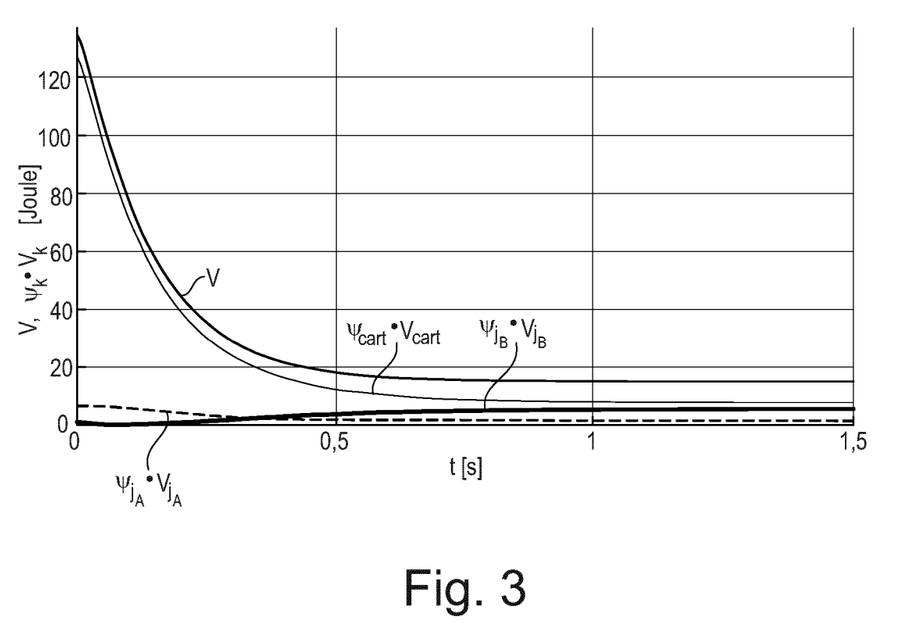
FIG. 3 shows transient response for an overdetermined (and thus conflicting) task setup.

The second presented simulation evaluates the controller's performance for a conflicting task setup, again for the regulation case. This time, a six-DOF Cartesian end effector task with stiffness $K_{cart}=\text{diag}([2000, 2000, 2000, 100, 100, 100])$ and damping $D_{cart}=\text{diag}([500, 500, 500, 20, 20, 20])$ was added to the previously described joint tasks A and B. The scalar task weights $\psi_k$ are set to 1. After starting the controller, the robot converges to an equilibrium position. Note that the overall Lyapunov function value V decreases monotonically, while the weighted subtask Lyapunov function values may also grow (as for example $\psi_{j_k} \cdot V_{j_k}$ in FIG. 3).

B. Humanoid Robot Simulations and Experiments

Figure 4:
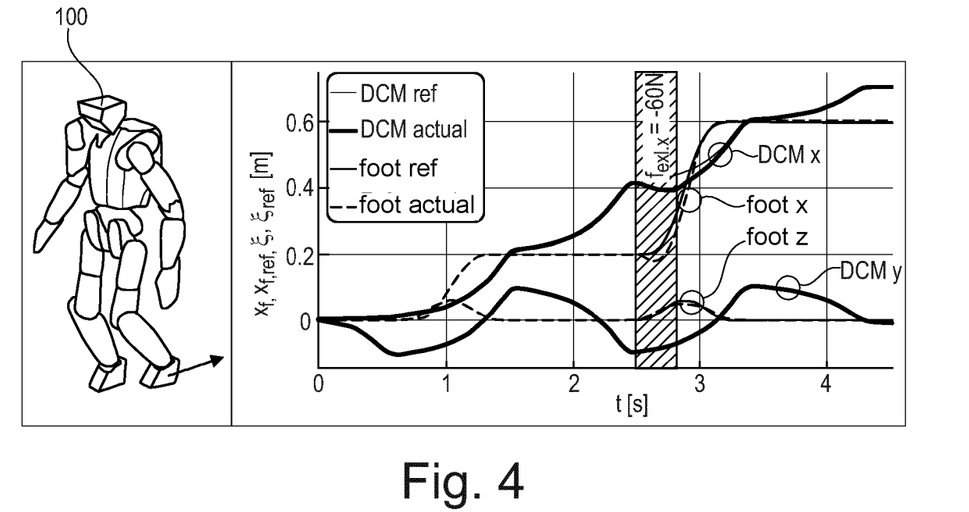
FIG. 4 shows a humanoid robot TORO walking in OpenHRP simulation (single and double support times: TSS=0.8 s, TDS=0.12 s). After 2.5 s, the left foot is perturbed by an external force of −60 N in the x direction for 0.3 s.

We performed walking simulations of the humanoid robot TORO (see FIG. 4), which were based on a hybrid WBC setup: Inverse Dynamics based torso orientation and overall posture tasks, a task for Divergent Component of Motion (DCM) (J. Englsberger, C. Ott, and A. Albu-Schäffer. Three-Dimensional Bipedal Walking Control Based on divergent component of motion. *IEEE Transactions on Robotics*, 31(2):355-368, April 2015. ISSN 1941-0468. doi: 10.1109/TRO.2015.2405592) control and angular momentum regularization, and Cartesian (6-DOF) MPTC-based controllers for foot tracking were mixed (Note: due to the modularity of MPTC, ID-based and MPTC-based tasks may be combined in the same overall control setup.). Precise tracking of the foot reference trajectories is achieved. After 2.5 s, the left foot is perturbed by a force of −60N in x-direction for 0.3 s, resulting in a maximum foot position error of 51 mm and a maximum DCM error of 45 mm. After the perturbation is removed, the foot converges fast enough to successfully continue walking.

Figure 5:
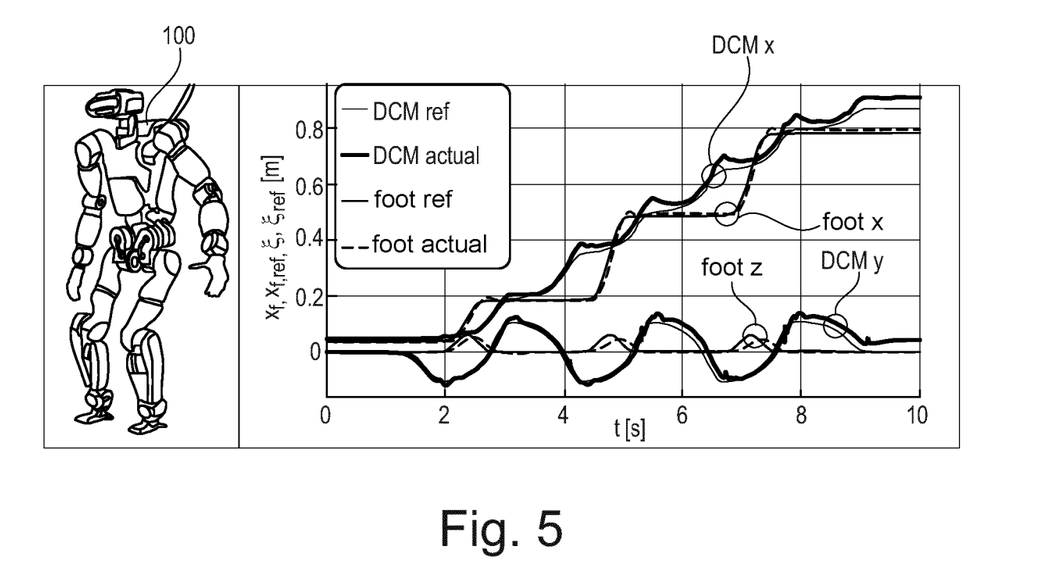
FIG. 5 shows TORO walking in an experiment (single and double support times: TSS=0.9 s, TDS=0.3 s, step length 0.15 m)

To evaluate the real-world performance of MPTC, we conducted several experiments using TORO, including push recovery (during stance), human-robot interaction and walking (a video can be found here https://youtu.be/WdF9UQK8aIo). Here, we present a walking experiment during which TORO took six steps forward (see FIG. 5 for details). Separate MPTC-based controllers were used for controlling the feet (six-DOF Cartesian tracking), torso (three-DOF rotational tracking), leg joints, waist joint and upper body joints (the latter three serving as overall pose control and regularization tasks). As for the simulations, a DCM-based controller and an angular momentum regularization controller were additionally applied. The walking performance was overall robust. However, tracking errors can be observed, which we believe are caused by torque offsets and joint friction. As compared to ID-based controllers (J. Englsberger, G. Mesesan, A. Werner, and C. Ott. Torque-Based Dynamic Walking—a long way from simulation to experiment. In *IEEE Int. Conf on Robotics and Automation (ICRA)*, pages 440-447, 2018), the tuning effort was low, giving evidence to MPTC's robustness in real-world settings.

VI. Conclusion and Future Work

This work introduced the so-called Modular Passive Tracking Controller (MPTC). This generic controller, at a first stage, intends to independently fulfill several subtask objectives. These primarily independent subtask controllers are then merged into an overall controller. The controller design and analysis is based upon Lyapunov theory, which facilitates statements about stability and passivity. One of the major contributions of this paper is the design of an optimization weighting matrix that, for fully actuated robots, guarantees the passivity of a complete set of conflicting subtasks. The proposed control framework was validated in several simulations and experiments for fixed-based and free-floating robots.

In our future research, we intend to extensively compare the control concepts of Inverse Dynamics (ID), the proposed Modular Passive Tracking Control (MPTC) and other passivity-based controllers, such as the PD+ controller. This extensive comparison will be based on theoretical analysis, simulations and hardware experiments.

Figure 6:
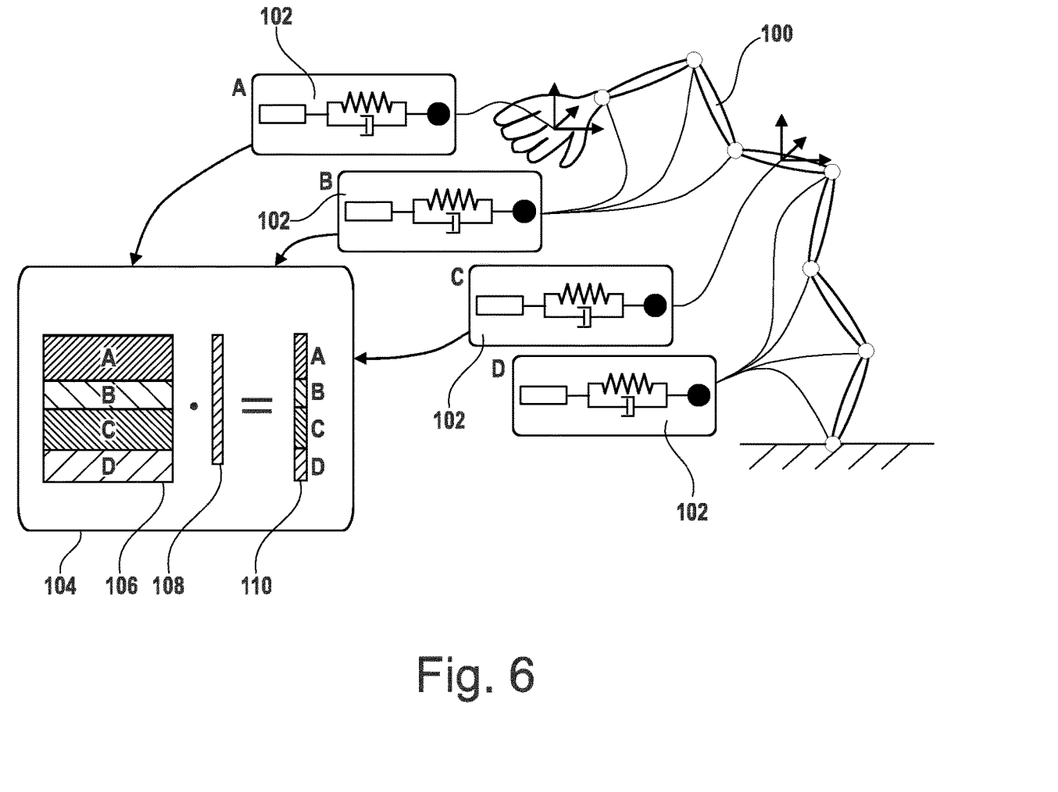
FIG. 6 shows one possible application of the method according to the present invention.

FIG. 6 shows an example of one possible application of the method according to the present invention. Multiple impedance-based controller modules 102 (modular passive tracking controllers) are integrated into an overall controller 104, using the method according to the present invention. In the example shown, the illustration of controller modules 102 in each case includes a reference trajectory and a mass that are connected to one another via a spring-damper system [sic], controller modules 102 denoted by reference symbols A and C each representing a Cartesian control task, while controller modules 102 denoted by reference symbols B and D are formulated as joint controllers. As shown in FIG. 6, the various controller modules 102, each made up of a task mapping matrix and a task vector, may be combined to form a stack of tasks made up of a unified task mapping matrix 106 and a combined task vector 110. By use of a suitable optimization method, for example with the aid of optimization variables 108, the controller modules represented by the stack of tasks may be fused to form an overall controller 104. An optimal compromise between the various subcontroller objectives is thus achieved, in particular the passivity of resulting overall controller 104 being implemented in the best possible way.

The word "may" may refer in particular to optional features of the present invention. Consequently, there are also refinements and/or exemplary embodiments of the present invention which additionally or alternatively have the particular feature or the particular features.

If necessary, individual features may also be selected from the feature combinations disclosed above and used in combination with other features, with resolution of a structural and/or functional relationship possibly existing between the features, for delimiting the subject matter of the claims.

LIST OF REFERENCE NUMERALS

100 robot
102 controller module
104 overall controller
106 task mapping matrix
108 optimization variables
110 task vector

What is claimed is:

1. A method for controlling a kinematically redundant robot in order to fulfill multiple tasks,
   comprising the steps of using at least one passivity-based first controller module,
   computing at least one task target description and at least one associated task mapping for the at least one first controller module,
   computing at least one task weighting in the form of a task-specific symmetrical matrix $W_k = \Psi_k M_k^{-1}$, wherein the matrix $W_k$ is composed of the inverse of the task inertia matrix $M_k$, where $M_k = (J_k M^{-1} J_k^T)^{-1}$, $J_k$ is the task Jacobian and M is the inertia matrix of the dynamic model of the robot, and a weighting scalar $\Psi_k$ for independently weighting different tasks with respect to each other, and
   integrating the at least one first controller module into an overall controller, using the at least one task weighting matrix $W_k$ which is combined in the form of submatrices into a symmetrical and block-diagonal overall weighting matrix W.

2. The method as recited in claim 1, wherein the at least one task target description and the at least one associated task mapping are computed in such a way that a nominal behavior of the at least one first controller module corresponds to the behavior of a mass-spring-damper system.

3. The method as recited in claim 1, wherein the at least one task target description and the at least one associated task mapping are computed based on a natural robot inertia.

4. The method as recited in claim 1, wherein the at least one task target description and the at least one associated task mapping are computed in such a way that task-specific Coriolis and centrifugal effects remain unchanged, while all other Coriolis and centrifugal effects are compensated for.

5. The method as recited in claim 1, wherein the at least one task target description is computed as a task vector, or the at least one associated task mapping is computed as a task mapping matrix.

6. The method as recited in claim 1, wherein at least one further controller module is integrated into the overall controller.

7. The method as recited in claim 1, wherein at least one further controller module formulated as a constraint is integrated into the overall controller.

8. The method as recited in claim 6, wherein the at least one further controller module is weighted.

9. The method as recited in claim 1, wherein the at least one first controller module or the at least one further controller module is weighted in such a way that the overall controller has an at least approximately passive behavior, even for an overdetermined control problem.

10. The method as recited in claim 1, wherein the at least one first controller module or the at least one further controller module is optimized with the aid of at least one pseudoinverse and/or at least one inverse.

11. The method as recited in claim 1, wherein the at least one first controller module and/or the at least one further controller module are/is quadratically optimized.

12. The method as recited in claim 1, wherein the first controller module is designed as a tracking controller.

13. The method as recited in claim 1, wherein the first controller module is designed as a regulation controller.

14. The method as recited in claim 1, wherein a separate controller module is assigned to each controllable degree of freedom.

15. A computer program product that includes commands which, when the program is executed with the aid of at least one processor, prompt the processor to carry out the method as recited in claim 1.

16. The method as recited in claim 1, wherein the multiple tasks are implemented at the same time.

17. The method as recited in claim 1, wherein each of the multiple tasks are independent with respect to each other.

18. The method as recited in claim 1, wherein each of the multiple tasks contribute to the overall result in correspondence to its weighting.

* * * * *